Figure 1:
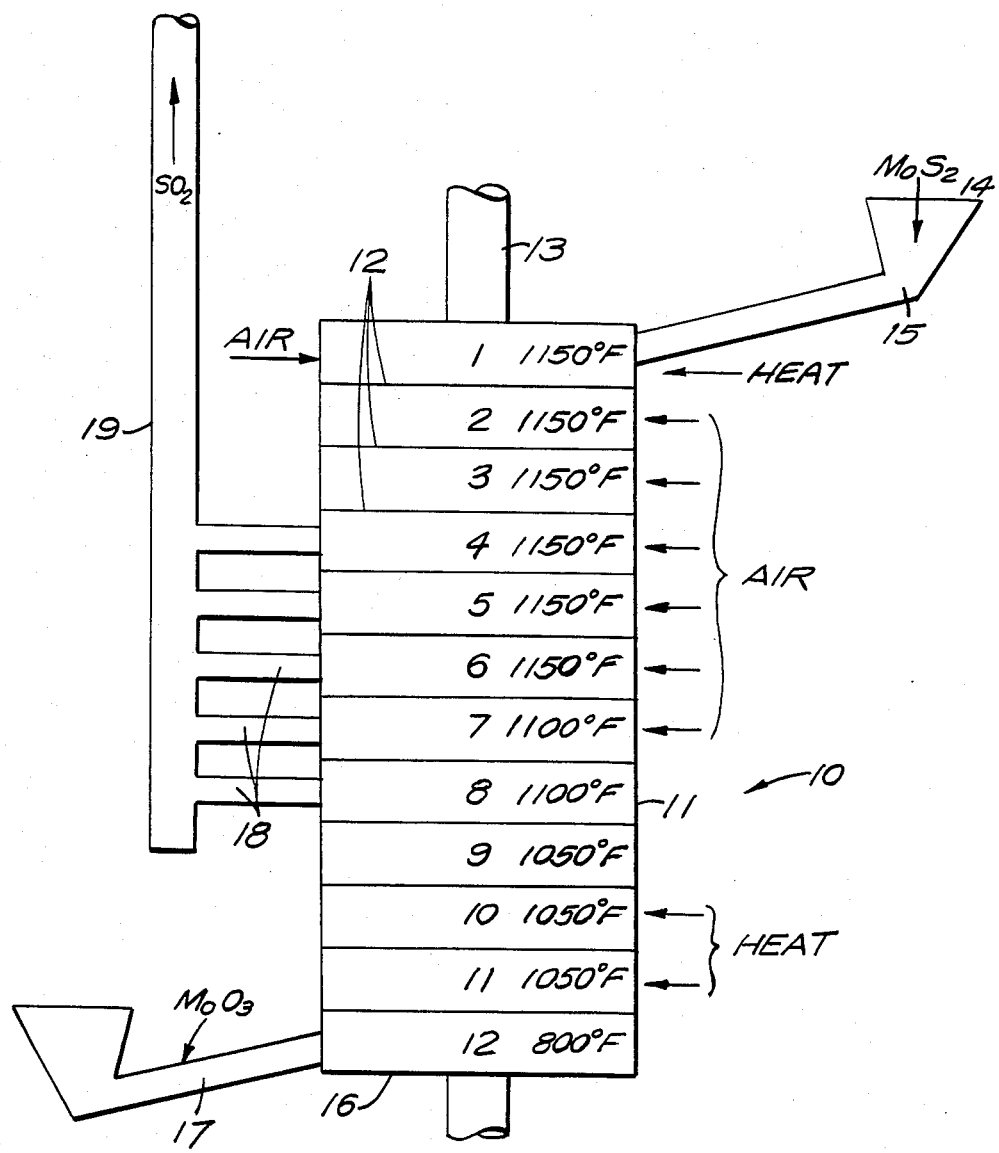

United States Patent [19]

McHugh et al.

[11] Patent Number: 4,523,948

[45] Date of Patent: Jun. 18, 1985

[54] ROASTING OF MOLYBDENITE CONCENTRATES CONTAINING FLOTATION OILS

[75] Inventors: Larry F. McHugh, Fairfield, Conn.; Daniel E. Barchers, Arvada, Colo.

[73] Assignee: Amax Inc., Greenwich, Conn.

[21] Appl. No.: 580,042

[22] Filed: Feb. 14, 1984

[51] Int. Cl.³ .............................................. C22B 1/06
[52] U.S. Cl. ........................................ 75/7; 423/53; 423/606; 423/542; 75/8
[58] Field of Search ......................... 423/606, 53, 542; 75/7–9, 1

[56] References Cited

U.S. PATENT DOCUMENTS

| | | | |
|---|---|---|---|
| 3,656,888 | 4/1972 | Barry et al. | 423/57 |
| 3,770,414 | 11/1973 | Lake et al. | 75/1 |
| 3,798,306 | 3/1974 | Lapat et al. | 423/53 |
| 4,034,969 | 7/1977 | Grimes | 266/82 |
| 4,221,588 | 9/1980 | Grimes | 75/7 |
| 4,437,884 | 3/1984 | Hawryluk et al. | 75/7 |

Primary Examiner—Melvyn J. Andrews
Assistant Examiner—Christopher W. Brody
Attorney, Agent, or Firm—Michael A. Ciomek; Eugene J. Kalil

[57] ABSTRACT

A method is provided for treating molybdenum concentrates in a roasting furnace having a first roasting zone and at least a second roasting zone, the concentrate containing residual flotation oil in an amount over 2% by weight which during roasting inhibits the roasting capacity of the furnace. The improvement resides in deoiling the molybdenite concentrate, feeding the deoiled concentrate to the first roasting zone, and applying heat to the concentrate in the first roasting zone, including the sensible heat of the concentrate and heat generated by extraneous fuel, sufficient to heat the concentrate to a roasting temperature sufficiently high to initiate a substantially self-sustaining roasting reaction but not exceeding about 1250° F. The amount of heat generated by combustion of the extraneous fuel is not substantially in excess of that required to heat the concentrate to the temperature at which self-sustaining roasting reactions are initiated in the first roasting zone. The roasting is continued through the first and at least the second roasting zone to effect desulfurization of the deoiled molybdenite concentrate and form molybdenum trioxide, whereby the improvement is characterized by increased sulfur dioxide concentration in the effluent gas and increased throughput capacity.

5 Claims, 3 Drawing Figures

ROASTING OF MOLYBDENITE CONCENTRATES CONTAINING FLOTATION OILS

This invention relates to a method for roasting molybdenite concentrates, particularly deoiled molybdenite concentrates using elemental sulfur as a roasting aid.

FIELD OF THE INVENTION

It is well known to convert molybdenite concentrates to molybdenum oxides, e.g., $MoO_3$, using multiple hearth furnaces of the type variously referred to as Herreshoff, Nichols, Nichols-Herreshoff, Wedge, Skinner, and other types of furnaces.

By the term "molybdenum concentrates" employed herein is meant those concentrates produced by flotation in which the ultimate concentrate contains retained amounts of flotation oil. One type of concentrate is that obtained from a molybdenite ore mined in Climax, Colo., comprising predominately quartz and feldspar gangue containing pyrite and minor amounts of sphalerite, galena, wolframite, fluorite, and cassiterite.

The ore is finely ground to release the molybdenite mineral which is then separated from the gangue by flotation using various types of flotation oils, e.g., pine oil, "vapor oil", etc., and other addition agents, a large portion of the oil (50–70%) generally remaining in the molybdenite concentrate.

Molybdenite concentrate may also be obtained as a byproduct of copper sulfide flotation wherein, during processing of the copper sulfide ore, a molybdenum-containing ore fraction is obtained from which a molybdenite concentrate is thereafter recovered by flotation.

In any event, the molybdenite concentrate usually contains over about 2% oil, for example, about 4% to 8% oil. The oil is useful in that it quickly brings the charge to ignition temperature during roasting. However, generally speaking, there is so much oil that the molybdenite being roasted tends to overheat. The presence of oil can be deleterious to the roasting process in that the air needed for combustion of the oil results in an excessive volume of gases. This results in diluting the effluent $SO_2$ gas which is needed for the efficient production of sulfuric acid. Moreover, the oil during the combustion thereof generates volatile hydrocarbons that result in the production of black sulfuric acid which is undesirable.

The problem is compounded during start-up, especially in humid summer weather, due to $H_2O$ build-up in the acid plant. This causes the $H_2O/SO_2$ ratio to get too high which results in more water being present than is needed to combine with the $SO_3$ produced in the acid plant which results in a loss of required acid strength. One method to overcome this problem is to burn elemental sulfur just prior to the entry of the effluent gas to the acid plant. In this way, the $SO_2$ concentration is then increased at the expense of increased heat load on the subsequent gas cooler.

It is known according to U.S. Pat. No. 3,833,352 to roast molybdenite concentrate containing small amounts of copper. However, the preparation of molybdenum trioxide from copper-containing molybdenite concentrates presents a number of difficulties. Unless the copper content of the charge before roasting is below about 3%, a liquid phase may form during roasting which causes balling or crusting of the charge which is not desirable. On the other hand, if attempts are made to further decrease the copper content to very low levels by selective flotation of the concentrate, there is an accompanying loss of molybdenum, the loss being greater the more copper is decreased. Such losses may range as high as 25% to 30% by weight based on the original molybdenum content. Thus, to avoid balling or crusting of the charge, the patent provides a method whereby the concentrate is preheated under inert conditions and then later caused to react with oxygen to produce molybdenum trioxide exothermically by contacting the preheated concentrate with oxygen when the preheated concentrate is at least 385° C. (725° F.), the conditions being such that maximum temperature reached by the concentrate while in contact with oxygen is within the range of 500° C. to 900° C. (932° F. to 1652° F.) such that the retention time in the roaster is greatly reduced. In a series of experiments carried out (note column 4, lines 41 to 54, of U.S. Pat. No. 3,833,352), the starting concentrate contained 51.7% Mo, 32.2% S, 6.6% Fe, 1.2% Cu, 0.42% $H_2O$, and 0.13% oil. The preheat temperature was 660° C. (1220° F.) prior to exposure to oxygen for the exothermic roasting of the concentrate. As will be apparent, the preheat was not for the purpose of drying and deoiling the concentrate, since the amount of water and oil is very low, each being less than 0.5%, but rather to prepare the concentrate for roasting while avoiding balling and crusting of the charge.

It would be desirable to provide a method for treating molybdenite flotation concentrate containing substantial amounts of flotation oils, for example, over 2% by weight of flotation oils, with or without water, for example, water in excess of 0.5%.

It would also be desirable to provide a method for assuring the proper concentration of $SO_2$ in the effluent gas going to the acid plant during the initial stages of roasting, and for overcoming the black acid problem caused by the combustion of the oil during roasting.

OBJECTS OF THE INVENTION

It is thus an object of the invention to provide a method for treating molybdenite concentrates which contain substantial retained amounts of one or more flotation oils.

Another object is to provide a method for treating oil-containing molybdenite concentrates while assuring an effluent gas containing proper amounts of $SO_2$ suitable for the production of sulfuric acid.

Figure 2:
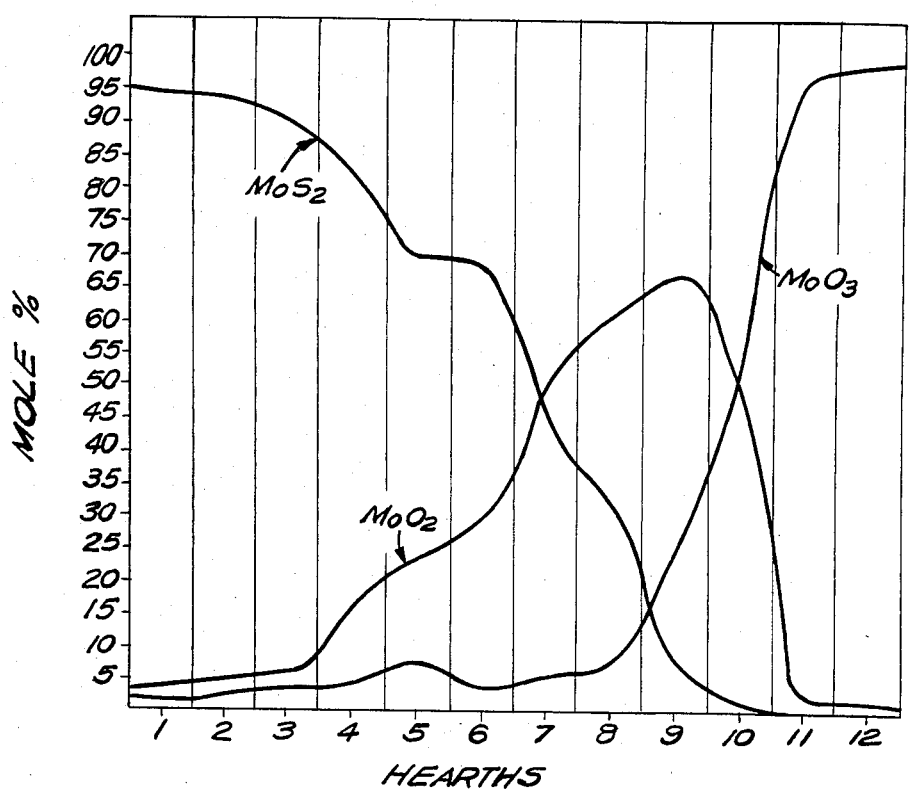
Figure 3:
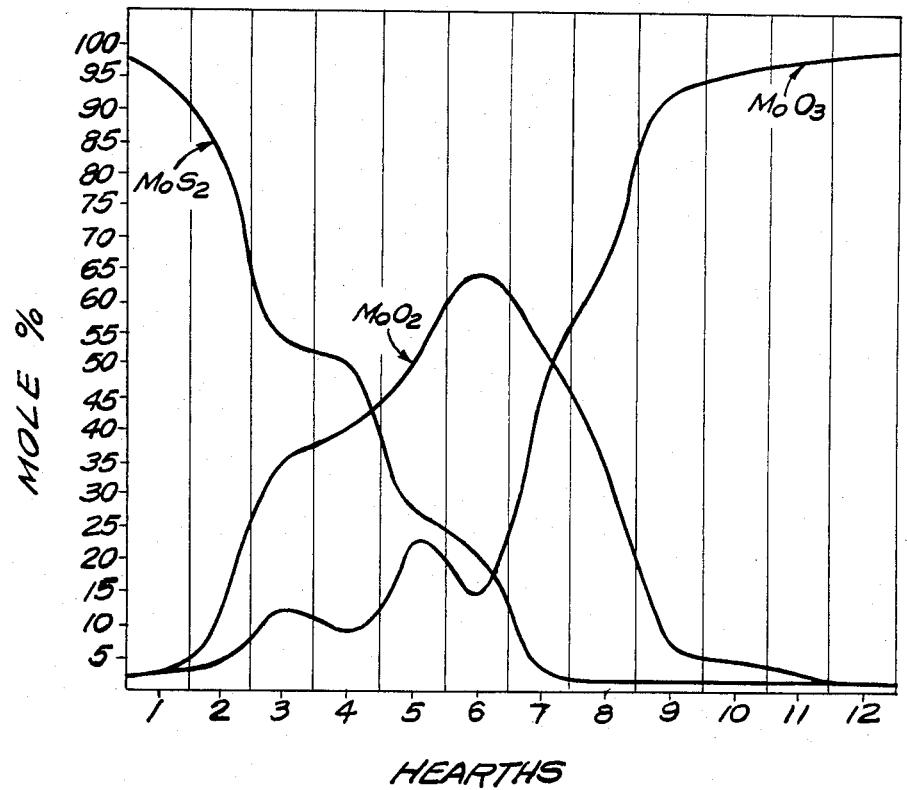

These and other objects will more clearly appear when taken in conjunction with the following disclosure and claims, and the appended drawing; wherein:

FIG. 1 is a schematic of a multi-hearth roasting furnace of the Nichols-Herreshoff type; and FIGS. 2 and 3 are profile curves of the concentration of the material on each hearth for oiled and deoiled concentrates, respectively, during roasting of molybdenite to molybdenum trioxide.

STATEMENT OF THE INVENTION

We have found a solution to the problem by employing a method which comprises: at least deoiling the molybdenum concentrate (and drying, if necessary), and then roasting the molybdenite concentrate to form molybdenum trioxide and $SO_2$, while collecting the resulting effluent gas containing $SO_2$ for use in producing sulfuric acid.

Molybdenite concentrates produced by flotation generally contain over about 2% flotation oils and optionally water in amounts ranging up to about 12% by weight. The concentrate is either dried separately (if necessary) to a moisture content of below about 0.5% by weight or dried and deoiled in a one-step operation at a temperature below the pyrolysis temperature of the flotation oil. The amount of flotation oil in the concentrate prior to deoiling may range from about 4% to 8% by weight of the concentrate.

Stating it broadly, the method of the invention comprises roasting molybdenum concentrates in a roasting furnace having a first roasting zone and at least a second roasting zone, said concentrate prior to roasting containing residual flotation oil in an amount over about 2% by weight which during roasting normally inhibits the roasting capacity of the furnace and adversely affects the sulfur dioxide concentration of the effluent gas. To overcome this problem, the improvement resides in deoiling the molybdenite concentrate to the exclusion of oxygen, feeding the deoiled concentrate to a first roasting zone, and applying heat to the concentrate in the first roasting zone, including the sensible heat of the concentrate and heat generated by extraneous fuel sufficient to heat the concentrate to a roasting temperature sufficiently high to initiate a substantially self-sustaining roasting reaction but not exceeding about 1250° F. (e.g., 680° C.). The amount of heat generated by combustion of extraneous fuel is not substantially in excess of that required to heat the concentrate to the temperature at which self-sustaining roasting reactions are initiated exothermically in the first roasting zone. The roasting is continued through the first and at least the second roasting zone to effect desulfurization of the deoiled molybdenite concentrate and form molybdenum trioxide, the improvement being characterized by increased sulfur dioxide concentration in the effluent gas and increased throughput capacity of the roasting furnace.

Where the concentrate is wet in addition to containing flotation oil, the concentrate may first be dried.

Following drying, the concentrate to the exclusion of oxygen is heated to a vaporizing temperature below the temperature at which the flotation oil pyrolyzes. The vapor thus obtained is condensed and collected and either used to augment the heating of the roasting furnace or in the condensed form recycled for use in the flotation circuit. The recycling is important economically. A typical vaporizing temperature for such oils is 750° F. (400° C.), although the temperature may range from approximately 650° F. (345° C.) to 850° F. (455° C.).

Following deoiling, heat is applied to the concentrate in the first roasting zone, including the sensible heat of the concentrate and heat generated by extraneous fuel sufficient to heat the concentrate to a roasting temperature sufficiently high to initiate exothermically a self-sustaining roasting reaction.

Preferably, the dried and deoiled concentrate is mixed with elemental sulfur or other non-contaminating sulfur-containing material as one source of extraneous fuel prior to being fed to the first roasting zone. The term "sulfur" used herein is meant to include said other sulfur-containing material. The amount of sulfur may range from about 5% to 15% by weight of the sulfur-concentrate mixture during normal operation, the amount selected being at least sufficient to effect sustained ignition of the concentrate and as high as 100% during roaster startup. Desirably, the amount should be at least sufficient to provide an effluent gas containing a minimum of 2.7% by volume of $SO_2$ in normal operation, recognizing that significantly higher levels of $SO_2$ strength are achievable and desirable to improve the acid plant $H_2O$ balance, heat balance, and acid productivity.

Following the preparation of the roasting charge, the charge is fed to a furnace of a multi-hearth type. An example of such a furnace is shown in the schematic of FIG. 1. However, any furnace can be employed which is compatible with the roasting characteristics of molybdenite.

Referring to the schematic of FIG. 1, a multi-hearth furnace 10 illustrated is comprised of an outer shell 11 of suitable heat resistant material supported by means not shown, the furnace having a plurality of multi-level hearths 12. An example of such a furnace is described in U.S. Pat. No. 4,034,969. Air and heat (e.g., gas flames) are fed to selected hearths as shown. Certain of the hearths may have outlet flues to promote cross flow. The air flow provides the necessary oxidizing atmosphere for roasting the ore. Each hearth has associated with it rabble arms (not shown) which project radially outward from a central shaft, e.g., shaft which is omitted from the hearths for clarity. As the shaft rotates, the sulfide concentrate 14 with or without elemental sulfur is fed from the top of the furnace via a feed chute 15 and falls from hearth to hearth as the concentrate is being rabbled. This aspect of the roasting is discussed in U.S. Pat. No. 4,034,969. As the concentrate courses its way downward, it is converted to an oxide and is discharged as calcine at the bottom at 16 into chute 17. The $SO_2$ which is formed leaves with the flue gas via flue gas conduits 18 and connecting conduit 19.

At the top of the hearth, the elemental sulfur when added burns to raise the concentrate to the ignition temperature, the temperature achieving a steady state distribution over the 12 hearths (note FIG. 1). If needed, fuel gas can be supplied as shown near the bottom of the furnace shown schematically in FIG. 1. The use of sulfur is particularly advantageous in providing a higher $SO_2$ content in the effluent gas which is highly desirable for the acid plant.

The roasting of the molybdenite may be effected by increasing or decreasing the flow of air into the furnace depending on the temperatures desired at the various hearth levels.

The roasting furnace employed may be a spray-cooled Herreschoff type disclosed in U.S. Pat. Nos. 4,034,969 and 4,221,588, these patents being assigned to the same assignee as the present application. The spray-cooled type furnace described in the foregoing patents is advantageous in that it assures substantially pinpoint control of the roasting temperature between the 1st to 4th hearth, although the spray-cooling technique can be employed on the other hearths as well if it is so desired. The roasting temperature is controlled by feeding water and air under pressure to at least one nozzle located relative to a hearth in which the temperature is to be controlled, the temperature being then sensed at the hearth, and the ratio of the water and air fed to the nozzle being varied according to the temperature desired in the hearth. However, the spray-cooling technique is not essential to this invention, the disclosure of the aforementioned patents being incorporated herein by reference to the extent that the techniques disclosed therein may be applicable in carrying out the novel concept of the present invention.

In carrying out the invention, the dilution of the flue gas with inert gases and hydrocarbons is minimized, as is the production of black acid. The heat of combustion of the elemental sulfur is first utilized in the first hearth of the roaster burden where it is needed. It is important that the amount of sulfur needed be controlled to avoid overheating of the upper hearths and excess air volume be minimized. By utilizing the concept of the invention, the capacity of the roaster-acid plant combination is maximized, since the factor limiting roaster capacity is the rate at which the heat can be removed. However, use of natural gas to heat the furnace is markedly decreased.

The roasting capacity may be increased to a high of about 25 or 30%.

The advantages of the invention compared to the prior art will be clearly apparent from computer simulation data of the roasting process carried out in a 12 hearth roaster which is given as follows:

TABLE 1

| Roaster Feed, % | | | Natural Gas to #1 Hearth | Total | $SO_2$ in Flue |
|---|---|---|---|---|---|
| Oil | $H_2O$ | $S°$ | SCFM | Air, SCFM | Gas, % |
| 6 | 3 | 0 | 0 | 10,600 | 3.2 |
| 2 | 3 | 0 | 20 | 7,900 | 4.3 |
| 0 | 0 | 0 | 50 | 8,400 | 4.0 |
| 0 | 0 | 12 | 0 | 7,900 | 5.9 |

As will be noted from the foregoing table, by drying and deoiling the concentrate and by using 12% by weight of elemental sulfur (last line of the table), the amount of natural gas, if desired, can be reduced to zero, the amount of air required reduced to 7,900 SCFM, and the $SO_2$ in the flue gas increased to as high as 5.9%. Comparing this to the first line in which the concentrate is roasted in the untreated condition, the amount of air required is 10,600 SCFM, with the flue gas containing substantially less $SO_2$, for example, 3.2%.

As illustrative of the invention, the following example is given:

EXAMPLE 1

(Deoiling)

The deoiling of the molybdenite charge was carried out in an indirectly fired deoiling kiln. The kiln comprises a rotating cylinder made of Inconel (trademark for an alloy containing about 15% Cr, about 7-8% Fe, and the balance nickel). The cylinder is about 25'-4¾" long, has a diameter of about 30 inches, is tilted to provide a slope of about 5/16 inch per foot of cylinder length, and has a heating section 18 feet long. The feed and discharge ends of the cylinder contain spiral flights, while the central heated section has agitated flights welded parallel to the axis of rotation.

The speed of rotation of the kiln is adjustable to between zero and approximately 6 rpm. The kiln is provided with two heating zones, inlet and outlet, each having its own continuous flame (natural gas burner), the temperature in each zone being independently controlled.

In carrying the invention into practice, a charge of the flotation concentrate having an average moisture content of about 3.3% and a flotation oil content of 6.5% was fed into the kiln. Heated nitrogen was introduced into the kiln concurrently with the flow of the concentrate to sweep out oil and water vapors and to prevent combustion of the volatilized oil or oxidation of the deoiled concentrate.

The concentrate passing through the kiln was gently dried and deoiled under the nitrogen atmosphere (about 1000 SCFM) at a product temperature below the pyrolyzing temperature of the oil, e.g., about 750° F. (400° C.). The kiln was rotated at about 3.5 rpm to provide a retention time for the charge of about 15 minutes in the 18 foot heating section at a dry production rate of at least about 2000 lbs./hour. At a rotational speed of about 2.5 rpm, efficient deoiling was achieved at a kiln product temperature as low as 650° F. (345° C.). The dried product was discharged through two knife gate valves, the operation of which was sequentially controlled to prevent entry of air from the product conveying system, a cooling system being employed to cool the product from a temperature of about 600°-700° F. (315°-370° C.) to approximately 200° F. (93° C.) prior to transportation of the product by two inclined screw conveyors to the product bin.

The material balance based on the treatment of a wet charge having a total weight of 1,086,481 lbs. passing through the kiln is given as follows:

TABLE 2

| | Wt. % | Weight (lbs.) |
|---|---|---|
| Input | | |
| Wet $MoS_2$ concentrate charged | — | 1,086,481 |
| Flotation oil content | 6.53 | 70,927 |
| Water content | 3.33 | 36,161 |
| $MoS_2$ charged on the dry basis | — | 979,393 |
| Molybdenum content | 54.13 | 530,144 |
| Output | | |
| Deoiled $MoS_2$ concentrate produced | — | 989,165 |
| Flotation oil content | 0.85 | 8,448 |
| Water content | 0.03 | 319 |
| Dry deoiled $MoS_2$ concentrate | — | 980,398 |
| Molybdenum content | 54.38 | 533,166 |

The oil and water vapors which contained entrained $MoS_2$ solids were condensed and the entrained solids separated by passing the condensed fluid through a Sweetland filter press.

The material balance of the recovered fluids and the retained solids as part of the output is given as follows:

TABLE 3

| Output | Wt. % | Weight (lbs.) |
|---|---|---|
| Wet filter cake collected | — | 4,491 |
| Flotation oil content | 11.41 | 512 |
| Water content | 17.57 | 789 |
| Dry weight filter cake collected | — | 3,190 |
| Molybdenum content | 47.88 | 1,530 |
| Flotation oil produced | — | 52,787 |
| Water from Coalescer | — | 4,053 |

The total $MoS_2$ solids entrained with the vapors amounted to 0.3% of feed. The amount of flotation oil recovered was 74.4% of the total amount in the wet feed.

The product temperature was considered to be the most important operating parameter. The flotation oil distillation curve indicated that a product temperature of about 700° F. is required. However, a high degree of oil removal was achieved at temperatures as low as 650° F. (345° C.), although the product temperature was normally set between 750°-800° F. (400°-427° C.). The high temperature enabled a constant production rate to be maintained and efficient deoiling attained with fluctuating oil and water concentrates in the concentrate feed.

The kiln deoiling of MoS₂ concentration led to the following conclusions:

(1) Regular grade MoS₂ concentrate could be deoiled to less than 1% oil at an average production rate of 2,415 lbs./hr.

(2) Efficient deoiling was achievable at a kiln retention time of 20 minutes and a product temperature of 650° F. (343° C.).

(3) The solids (MoS₂ concentrate) entrained in the sweep gas, oil and water vapors were 0.3% by weight, the solids being successfully recoverable from the condensed flotation oil in a Sweetland filter press.

(4) About 74.4% of the flotation oil was recovered. The oil was black compared to the golden color of new oil.

(5) Most of the water in the wet charge was evaporated.

(6) The heat utilized in the indirectly fired rotary kiln was about 40%. However, in a fully operational plant, a recuperation system would be employed to improve efficiency.

As a result of the drying and deoiling of the MoS₂ concentrate, a 30% increase in throughput was obtained in the subsequent roasting of the concentrate as will clearly appear from the following example:

EXAMPLE 2

(Roasting)

The roasting was carried out in a 12-hearth roaster of the type shown schematically in FIG. 1. In roasting the deoiled concentrate, five natural gas burners were used in the No. 1 hearth, each with a maximum heating capacity of one million Btu's per hour. The temperature ranged over the first 8 hearths from about 1100° F. to 1150° F. (594° C. to 621° C.). Broadly speaking, the temperature may range from about 1050° F. to 1250° F. (565° C. to 677° C.).

A roasting regime was employed in which for twelve days deoiled concentrate was charged at an average rate of 35,888 lbs. contained Mo per day. In contrast, regular concentrate (not deoiled) was roasted over a thirteen-day period at an average throughput of 27,814 lbs. of contained Mo per day. The deoiled concentrate showed an increase in throughput of about 29% over the regular concentrate. Assuming that the average rate of roasting regular concentrate would reach a capacity of 30,000 lbs. of contained Mo per day, the increase in product rate would still be high at about 20%. In an eight-day roasting campaign, the deoiled concentrate reached a production rate of 37,817 lbs. of contained Mo per day. This comes to a 26% increase based on a capacity of 30,000 lbs. per day of regular concentrate (that is, concentrate not deoiled).

Deoiling of the MoS₂ concentrate has a beneficial effect on the roasting characteristics of the concentrate in the multiple hearth roasting furnace. This will be clearly apparent by comparing the difference in roasting profile of the regular concentrate with the deoiled concentrate as shown in FIGS. 2 (regular concentrate) and 3 (the deoiled concentrate).

Referring to FIG. 2, it will be noted that concentration of MoS₂ in the regular concentrate gradually falls from the 1st hearth to the 6th hearth and finally falls to below 5 mol. % after the 9th hearth, while the formation of MoO₂ reaches a maximum at the 9th hearth and then drops to below 5 mol. % at the 11th hearth. The MoO₃ reaches its peak at the 11th hearth.

In contradistinction, the roasting of the deoiled concentrate proceeds very rapidly from the 1st to the 6th hearth, with the concentration falling below 5 mol. % at about the 7th hearth. The concentration of MoO₃ reaches a maximum at the 6th hearth as compared to the 9th hearth for the regular concentration.

In addition to the profile curves of FIGS. 2 and 3, reference is made to Tables 4 and 5 below which compare the roasting data of the regular concentrate (Table 4) with the roasting data of the deoiled concentrate (Table 5).

TABLE 4

| Hearth Number | Weight % MoS₂ | Weight % MoO₃ | Weight % MoO₂ | Mole % MoS₂ | Mole % MoO₃ | Mole % MoO₂ |
|---|---|---|---|---|---|---|
| 1 | 84.25 | 1.51 | 3.04 | 94.68 | 1.91 | 3.41 |
| 2 | 83.15 | 2.01 | 3.48 | 93.55 | 2.54 | 3.91 |
| 3 | 80.60 | 2.73 | 4.67 | 91.24 | 3.47 | 5.29 |
| 4 | 74.15 | 2.73 | 12.86 | 81.33 | 3.41 | 14.26 |
| 5 | 62.77 | 5.95 | 20.88 | 69.50 | 7.41 | 23.09 |
| 6 | 61.47 | 2.56 | 25.20 | 68.66 | 3.21 | 28.13 |
| 7 | 40.35 | 4.38 | 43.80 | 45.32 | 5.53 | 49.15 |
| 8 | 29.85 | 5.13 | 53.87 | 33.37 | 6.45 | 60.18 |
| 9 | 7.60 | 19.83 | 61.74 | 8.30 | 24.34 | 67.36 |
| 10 | 2.02 | 40.2 | 45.39 | 2.18 | 48.82 | 49.00 |
| 11 | 0.1 | 86.31 | 2.65 | 0.10 | 97.25 | 2.65 |
| 12 | 0.1 | 86.56 | 2.03 | 0.10 | 97.86 | 2.04 |

TABLE 5

| Hearth Number | Weight % MoS₂ | Weight % MoO₃ | Weight % MoO₂ | Mole % MoS₂ | Mole % MoO₃ | Mole % MoO₂ |
|---|---|---|---|---|---|---|
| 1 | 86.20 | 2.17 | 1.81 | 95.30 | 2.70 | 2.00 |
| 2 | 76.92 | 3.45 | 10.16 | 84.57 | 4.26 | 11.17 |
| 3 | 48.10 | 9.97 | 31.78 | 52.82 | 12.31 | 34.87 |
| 4 | 46.20 | 6.99 | 36.07 | 51.28 | 8.72 | 40.00 |
| 5 | 24.90 | 18.52 | 44.19 | 27.71 | 23.16 | 49.13 |
| 6 | 18.82 | 11.10 | 56.39 | 21.47 | 14.24 | 64.29 |
| 7 | 2.70 | 35.86 | 47.08 | 3.00 | 44.76 | 52.24 |
| 8 | 0.80 | 52.90 | 31.86 | 0.87 | 64.57 | 34.56 |
| 9 | 0.50 | 79.23 | 7.06 | 0.52 | 92.18 | 7.30 |
| 10 | 0.57 | 83.26 | 3.81 | 0.58 | 95.53 | 3.89 |
| 11 | 0.37 | 84.00 | 2.58 | 0.38 | 96.97 | 2.65 |
| 12 | 0.25 | 85.98 | 1.31 | 0.25 | 98.41 | 1.33 |

As will be noted from FIGS. 2 and 3, the roasting profile of the deoiled concentrate shifts to the left of the chart and indicates that the roasting proceeds more rapidly and in fact has a beneficial effect on the production rate as pointed out earlier.

This is in keeping with the fact that a 30% increase in throughput is achievable without much difficulty. Hearth temperatures remained relatively constant. The roasting treatment of deoiled concentrate indicates a reduction in the unit flue gas volume and an increase in the SO₂ concentration in the effluent gas which confirms generally the computer simulation data of the roasting process set forth hereinbefore.

Although the present invention has been described in conjunction with preferred embodiments, it is to be understood that modifications and variations thereto may be resorted to without departing from the spirit and scope of the invention as those skilled in the art will readily understand. Such modifications and variations are considered to be within the purview and scope of the invention and the appended claims.

What is claimed is:

1. In a method for treating molybdenum concentrates in a roasting furnace having a first roasting zone and at least a second roasting zone, said concentrate containing residual flotation oil in an amount over 2% by weight which during roasting inhibits the roasting capacity of said furnace and adversely affects the sulfur dioxide concentration of the effluent gas, the improvement which comprises:

deoiling said molybdenite concentrate by heating it to a vaporizing temperature below the temperature at which the oil pyrolyzes, mixing sulfur with said deoiled concentrate in an amount at least sufficient to provide after roasting an effluent gas containing a minimum of about 2.7% by volume of $SO_2$, feeding said heated deoiled concentrate to said first roasting zone, applying heat to said concentrate in said first roasting zone, including the sensible heat of said concentrate and heat generated by sulfur, sufficient to heat said concentrate to a roasting temperature sufficiently high to initiate a substantially self-sustaining roasting reaction but not exceeding about 1250° F., the amount of heat generated by combustion of said sulfur being not substantially in excess of that required to heat the concentrate to said temperature at which self-sustaining roasting reactions are initiated in said first roasting zone, and continuing the roasting through the first and at least the second roasting zone to effect desulfurization of said deoiled molybdenite concentrate and form molybdenum trioxide.

2. The method of claim 1, wherein the molybdenite concentrate contains at least about 0.5% by weight of moisture, and wherein the concentrate is dried and deoiled using a temperature which is below the pyrolysis temperature of the flotation oil.

3. The method of claim 1, wherein the sulfur added ranges from about 5% to 15% by weight.

4. In a method for roasting wet molybdenum concentrates in a roasting furnace having a first roasting zone and at least a second roasting zone, said concentrate containing at least about 0.5% water and residual flotation oil in an amount over 2% by weight which during roasting inhibits the roasting capacity of said furnace and adversely affects the sulfur dioxide concentration of the effluent gas, the improvement which comprises:

drying and deoiling said molybdenite concentrate by heating said concentrate to a temperature not exceeding about 850° F. but below the temperature at which the flotation oil pyrolyzes, mixing sulfur with said deoiled concentrate in an amount ranging from about 5% to 15% by weight of the sulfur concentrate mixture, feeding said dried and deoiled concentrate to said first roasting zone, applying heat to said concentrate in said first roasting zone, including the sensible heat of said concentrate and heat generated by sulfur, sufficient to heat said concentrate to a roasting temperature sufficiently high to initiate a substantially self-sustaining roasting reaction but not exceeding about 1250° F., the amount of heat generated by combustion of said sulfur being not substantially in excess of that required to heat the concentrate to said temperature at which self-sustaining roasting reactions are initiated in said first roasting zone, and continuing the roasting through the first and at least the second roasting zone to effect desulfurization of said deoiled molybdenite concentrate and form molybdenum trioxide.

5. The method of claim 4, wherein the amount of flotation oil in the concentrate prior to roasting ranges from about 4% to 8%, and wherein the amount of water ranges up to about 12% by weight of the concentrate.

* * * * *